(12) United States Patent
Bates et al.

(10) Patent No.: US 6,664,990 B1
(45) Date of Patent: Dec. 16, 2003

(54) COMPUTER DISPLAY POINTER WITH ALTERNATE HOT SPOTS

(75) Inventors: Cary Lee Bates, Rochester, MN (US); Paul Reuben Day, Rochester, MN (US); Jeffrey Michael Ryan, Byron, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/456,212

(22) Filed: Dec. 7, 1999

(51) Int. Cl.7 .............................................. G06K 15/00
(52) U.S. Cl. ...................................... 345/857; 345/711
(58) Field of Search .................... 345/711, 710, 345/708–709, 714–715, 786, 859–861, 808–809, 858, 754, 827, 802, 857, 160; 707/502, 501

(56) References Cited

U.S. PATENT DOCUMENTS

| | | | | |
|---|---|---|---|---|
| 5,822,123 A | * | 10/1998 | Davis et al. ................ 348/564 |
| 5,872,558 A | | 2/1999 | Hidaka ........................ 345/157 |
| 5,995,101 A | * | 11/1999 | Clark et al. ................. 345/711 |
| 6,018,345 A | * | 1/2000 | Berstis ........................ 345/859 |
| 6,065,021 A | * | 5/2000 | George ........................ 707/502 |
| 6,075,537 A | * | 6/2000 | Adapathya et al. ......... 345/859 |
| 6,078,323 A | * | 6/2000 | Gest ............................ 345/711 |
| 6,078,935 A | * | 6/2000 | Nielsen ....................... 345/711 |
| 6,219,679 B1 | * | 4/2001 | Brisebois et al. ........... 707/501 |
| 6,229,525 B1 | * | 5/2001 | Alexander .................. 345/857 |
| 6,297,799 B1 | * | 10/2001 | Knittel et al. ............... 345/856 |
| 6,326,986 B1 | * | 12/2001 | Alexander .................. 345/764 |
| 6,462,763 B1 | * | 10/2002 | Mostyn ....................... 345/856 |

\* cited by examiner

Primary Examiner—Steven Sax
(74) Attorney, Agent, or Firm—Wood, Herron & Evans, LLP

(57) ABSTRACT

A computer system and method of performing a second chance pointer operation wherein a pointer displayed on a computer display includes at least one alternate hot spot. In response to a pointer event, such as a mouse click, with a default hot spot not overlaying a graphical display element, or graphical user interface (GUI) object (e.g., icon, hypertext link, window tool bar), the object may nonetheless be selected if another hot spot on the pointer overlays the object, e.g., by resignaling the pointer event with the alternate hot spot. Advantageously, the resignaling of the pointer event may include selecting the overlaid GUI object, and/or providing feedback to the user regarding the alternate hot spots.

21 Claims, 6 Drawing Sheets

US 6,664,990 B1

COMPUTER DISPLAY POINTER WITH ALTERNATE HOT SPOTS

FILED OF THE INVENTION

The invention is generally related to computer systems and graphical user interface environments therefor. More particularly, the invention is related to user manipulation of windows and other user interface controls in a graphical user interface environment.

BACKGROUND OF THE INVENTION

As computers have become more complex and powerful, the manner in which end users or operators interface with computers has grown increasingly important. Early computers relied on switches, lights, and/or punch cards that required an end user to interact essentially in the computers' native binary languages. Eventually, video displays were developed that enabled end users to interact with computers through textual information and commands. Another significant step in this evolution was the development of graphical user interfaces (GUIs), which permitted end users to interact with computers through the more intuitive operations of "pointing and clicking" on graphical display elements or objects with a pointer (or cursor) controlled by a mouse or other user interface device.

The graphical user interface (GUI) generally includes presenting graphical display elements (or "GUI objects") as two-dimensional images of pixels on a computer display. The pointer is typically presented as overlaying all other elements. One coordinate on the movable pointer is a "hot spot," the current position of the coordinate relative to the computer display identifying a specific location (i.e., coordinate position) on the computer display and thus a specific graphical display element at that specific location.

Many user-manipulated pointing devices that control a pointer are adapted to perform a pointer event at the specific location of the hot spot. For example, a single button click on the pointer device may select a graphical display element at the specific location of the hot spot. A double button click on the pointer may execute associated programming of the graphical display element (e.g., an icon shortcut prompting execution of a file).

Positioning the "hot spot" of a pointer over a desired graphical display element such as an icon or hypertext link is often difficult to accomplish, leading to frustration and lowered productivity. In some instances, a user has diminished visual or physical abilities, or lack of training, to correctly position the pointer.

Pointer positioning difficulty may also be attributable to the computer system. For example, a computer display may provide a high density presentation of material, rendering graphical display elements relatively small. Similarly, small computer displays such as with palm-held devices may make graphical display elements difficult to select. Also, some pointing devices may be overly sensitive to user inputs, generating a large displacement of the pointer in response to a small input. Reducing the sensitivity may be inappropriate due to the corresponding increase in the required user input (e.g., in time or distance) for the pointer to traverse the computer display.

In addition to the user and hardware limitations, the content displayed on a computer display may include small graphical display elements, making difficult user selection with a pointing device. Moreover, making the pointer smaller so as to make its hot spot more intuitive is generally not practical due to difficulty in seeing the pointer.

Failing to place the hot spot of the pointer at the desired location on the computer display creates problems by failing to perform the desired function, thus having to repetitively readjust the pointer and perform a pointer event, such as a button click. Alternatively, the inability to correctly place the pointer may cause an inadvertent function. For example, an inactive window may be inadvertently selected, with window refocus hiding the graphical display element of interest. As another example, a window tool bar icon, such as "Save" may be inadvertently selected rather than a desired "Undo" icon, perhaps losing data.

Therefore, a significant need exists for an improved manner of activating graphical display elements with a pointing device.

SUMMARY OF THE INVENTION

The invention addresses these and other problems associated with the prior art in providing an apparatus, program product and method in which a movable pointer, controlled by a user-manipulated pointing device, incorporates an alternate hot spot for use in interacting with a graphical display element on a computer display. More specifically, in response to a user selection operation with the user-manipulated pointing device with the first coordinate of the pointer not disposed within an input region of a graphical display element (or GUI object), a second chance pointer operation is performed at a second coordinate of the pointer.

In one aspect consistent with the invention, the graphical display element is selected in response to the second coordinate being within the input region of the graphical display element. This enables a user that may miss an intended targeted graphical display element nonetheless to select the targeted graphical display element if the alternate hot spot (e.g., second coordinate) is disposed over that target. As such, user mistakes may be minimized and user productivity can be increased.

In another aspect consistent with the invention, in response to a first pointer event at the first coordinate position, a second pointer event is generated at the second coordinate position.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there are described exemplary embodiments of the invention.

DETAILED DESCRIPTION

Figure 1:
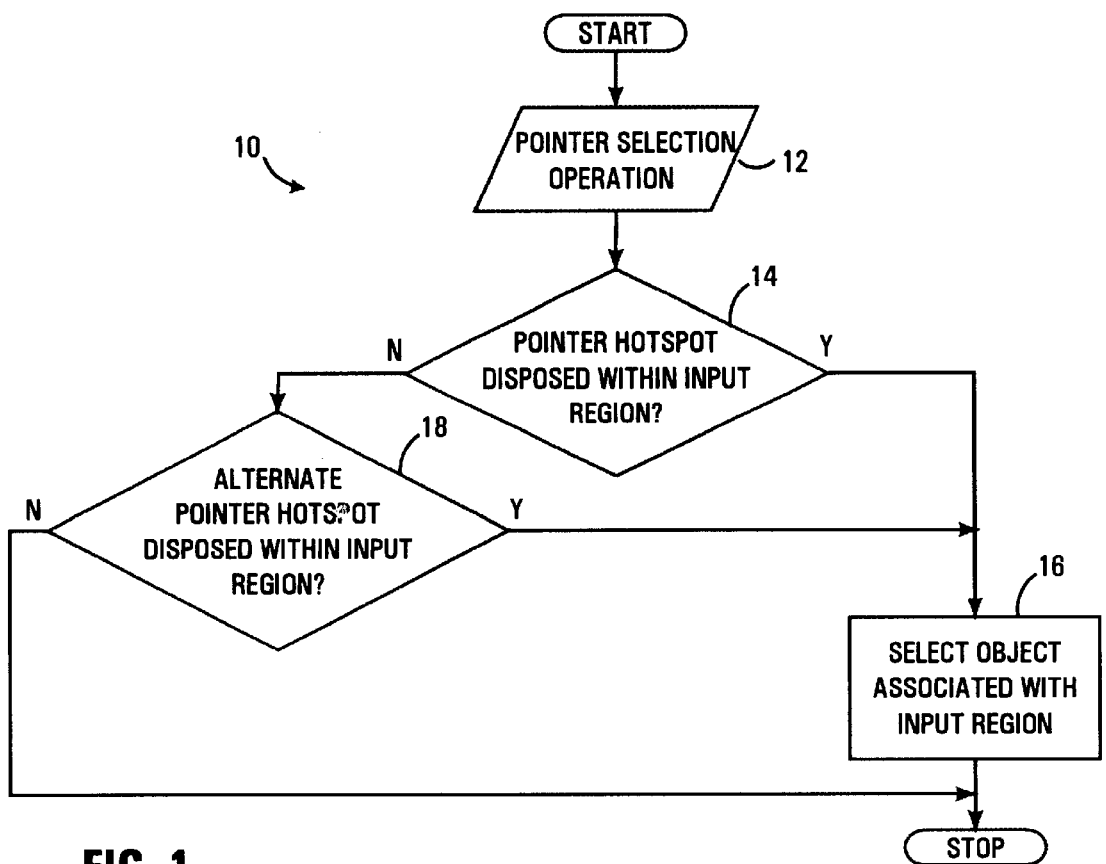
FIG. 1 is a flowchart illustrating a pointer monitor routine, providing second chance pointer operation of a graphical user interface (GUI) consistent with the invention.

Turning to the Drawings, wherein like numbers denote like parts throughout the several views, referring to FIG. 1, a flowchart illustrates a representative pointer monitor routine 10 for use in describing the general operation of a graphical user interface (GUI) second chance pointer operation consistent with the invention. As will become apparent below, routine 10 establishes multiple hot spots or coordinates for a pointer for use in performing user actions with the pointer.

Initially, routine 10 waits for a user selection operation (block 12), typically resulting from a user-manipulated pointer (e.g., left button click on a computer mouse). It should be appreciated that a user selection operation includes various user interactions with the graphical user interface. Thus, a user selection operation includes designating a graphical display element and causing execution of programming associated with a graphical display element. In addition, as will be described below for FIG. 10C, a user selection operation further includes positioning a pointer without necessarily clicking a button on the pointer.

A determination is then made as to whether a pointer hot spot is disposed within an input region of the computer display wherein the graphical user interface has associated processing (block 14). A pointer (or cursor) depicted on a computer display typically has a specific first coordinate relative to the depiction of the pointer that is the default hot spot. Associated processing typically exists when the first coordinate overlays an input region of a GUI object or element such as an icon, hypertext markup language (HTML) object (e.g., a hypertext link), window menu, window tool bar object, etc. When a user selection operation (e.g., a pointer event such as a mouse click) occurs with the first coordinate or active hot spot over a GUI object, then the GUI object associated with the input region is selected (block 16), as is typical with GUI operating systems.

However, if in block 14 the default hot spot (first coordinate) is not disposed within an input region, then a "second chance pointer operation" is performed by determining whether an alternate cursor or pointer hot spot is disposed within the input region (block 18). If the condition in block 18 is satisfied, then the GUI object associated with the input region is selected at block 16. After block 16 or if the condition of block 18 is not satisfied, routine 10 is complete.

Advantageously, the cursor or pointer may have defined one or more alternate hot spots (e.g., second coordinate, third coordinate, etc.). When more than one alternate hot spot is defined, the alternate hot spots are typically evaluated in a prioritized fashion. Thus, the determination in block 18 may be iterative when a plurality of alternate hot spots are defined, checking each coordinate until an input region is selected or all defined coordinates are exhausted.

It will be appreciated that routine 10 may be continuously active or intermittently performed. Moreover, the selection of the GUI object with an alternate hot spot may entail performing the associated processing just as if the default hot spot (first coordinate) had selected the input region. Alternatively, or in addition to this processing, an alternate hot spot may advantageously provide feedback to the user for purposes such as training the user as to correct placement of a pointer or cursor and/or providing an opportunity for the user to confirm a selection.

Figure 2:
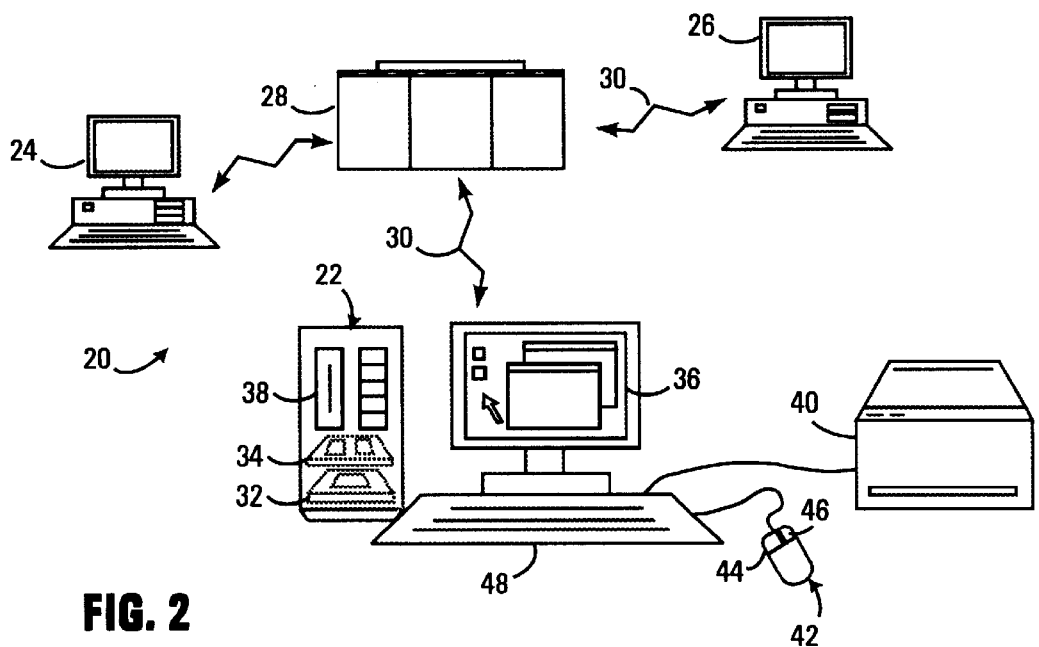
FIG. 2 is a block diagram of a computer system consistent with the invention.

Having introduced the concept of a second chance pointer operation, an implementation in a representative hardware environment begins at FIG. 2, where a computer system 20 consistent with the invention is illustrated. Computer system 20 is illustrated as a networked computer system including one or more client computer systems 22, 24 and 26 (e.g., desktop or personal computers, workstations, etc.) coupled to server system 28 through a network 30. Network 30 may represent practically any type of networked interconnection, including but not limited to local-area, wide-area, wireless, and public networks (e.g., the Internet). Moreover, any number of computers and other devices may be networked through network 30, e.g., multiple servers. Furthermore, it should be appreciated that the principles of the invention may be utilized as well by stand-alone computers and associated devices consistent with the invention.

Computer system 22, which may be similar to computer systems 24, 26, may include a processor such as a microprocessor 32; a memory 34; a number of peripheral components such as a computer display 36; storage devices 38 such as hard, floppy, and/or CD-ROM disk drives; a printer 40; user-manipulated pointing devices such as a mouse 42 having a left button 44 and right button 46; and a keyboard 48, among others. Computer system 22 operates under the control of an operating system, and executes various computer software applications, programs, objects, modules, etc. Moreover, various applications, programs, objects, modules, etc. may also execute on one or more processors in server 28 or other computer systems 24, 26, e.g., in a distributed computing environment.

Computer display 36 may include any known manner of visual or tactile presentation of information to a user. For example, computer display 36 may be a video monitor, e.g., a cathode-ray tube (CRT), a liquid crystal display (LCD), or a projection display, among others. In addition, other types of computer displays, including two-dimensional displays that simulate three dimensions (e.g., virtual reality headsets), as well as three-dimensional displays such as holographic tanks and the like, may also be used.

User input may also be received from other known user input devices. For example, control of a pointer on a display may be handled by a trackball, a joystick, a light pen, a touch sensitive pad or display, a digitizing tablet, and a keyboard, among others. In addition, many of such devices include one or more user controls such as buttons, thumb wheels, sliders and the like. Moreover, voice and/or image recognition may be used to permit a user to provide voice commands and/or gestures to provide user input to a computer system. Other user interface devices may also be used in the alternative.

In general, the routines executed to implement the illustrated embodiments of the invention, whether implemented as part of an operating system or a specific application, program, object, module or sequence of instructions will be referred to herein as "computer programs." The computer programs typically comprise instructions which, when read and executed by one or more processors in the devices or systems in networked computer system 20, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy disks, hard disk drives, CD-ROM's, DVD's, and transmission type media such as digital and analog communications links.

Those skilled in the art will recognize that the exemplary environment illustrated in FIG. 2 is not intended to limit the present invention. Indeed, those skilled in the art will recognize that other alternative hardware environments may be used without departing from the scope of the present invention.

Figure 3:
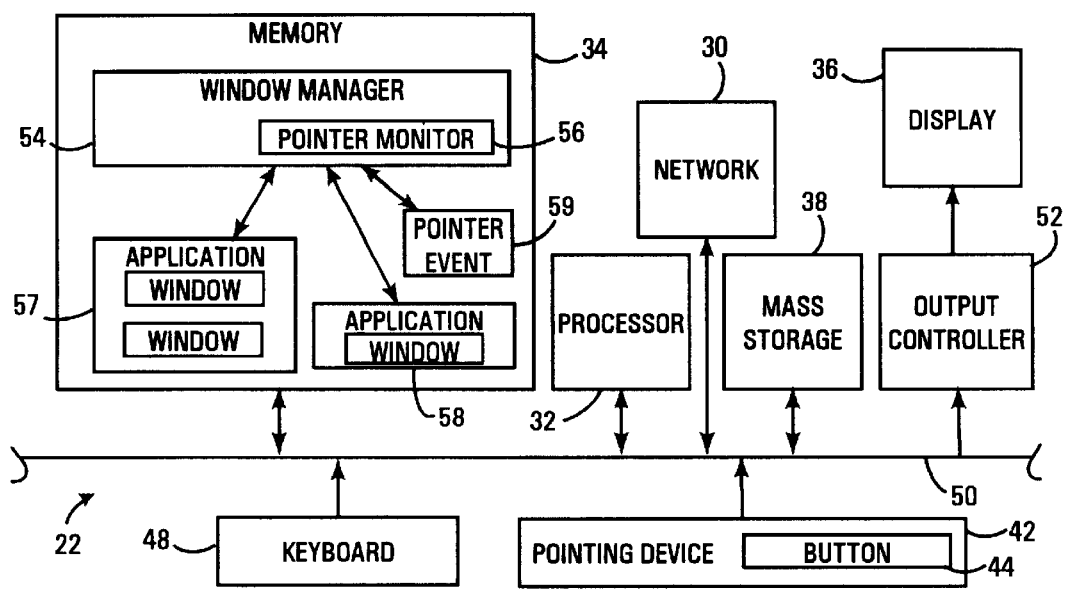
FIG. 3 is a block diagram of an exemplary software environment for the computer system of FIG. 2.

FIG. 3 illustrates a number of software components suitable for implementing second chance functionality in computer system 22 consistent with the invention. Computer system 22 is typically under the control of an operating system incorporating various functionalities such as that of a window manager 54, shown as resident in memory 34. Manager 54 is shown including a pointer monitor 56 operatively responsive to actuation of pointing device 42. Window manager 54 generally provides, in conjunction with an output controller 52 coupled to display 36, an event-driven graphical user interface (GUI) environment for handling the display of information to, and the receipt of input from, a user. However, it should be appreciated that routines consistent with the invention may also find use in other processes than a window manager. For example, routines consistent with the invention may find use in various computer software applications that execute on top of an operating system, such as applications 57, 58.

A pointer event may be communicated within the computer system 22 with a pointer event process 59, shown as resident in memory 34 and operably coupled to the manager 54.

It should be appreciated that the window manager 54 and pointer monitor 56 may be stored on network 30 or mass storage 38 prior to start-up. In addition, each may have various components that are resident at different times in any of memory 34, mass storage 38, network 30, or within registers and/or caches in processor 32 (e.g., during execution thereof). It should also be appreciated that other software environments may be utilized in the alternative.

Figure 4:
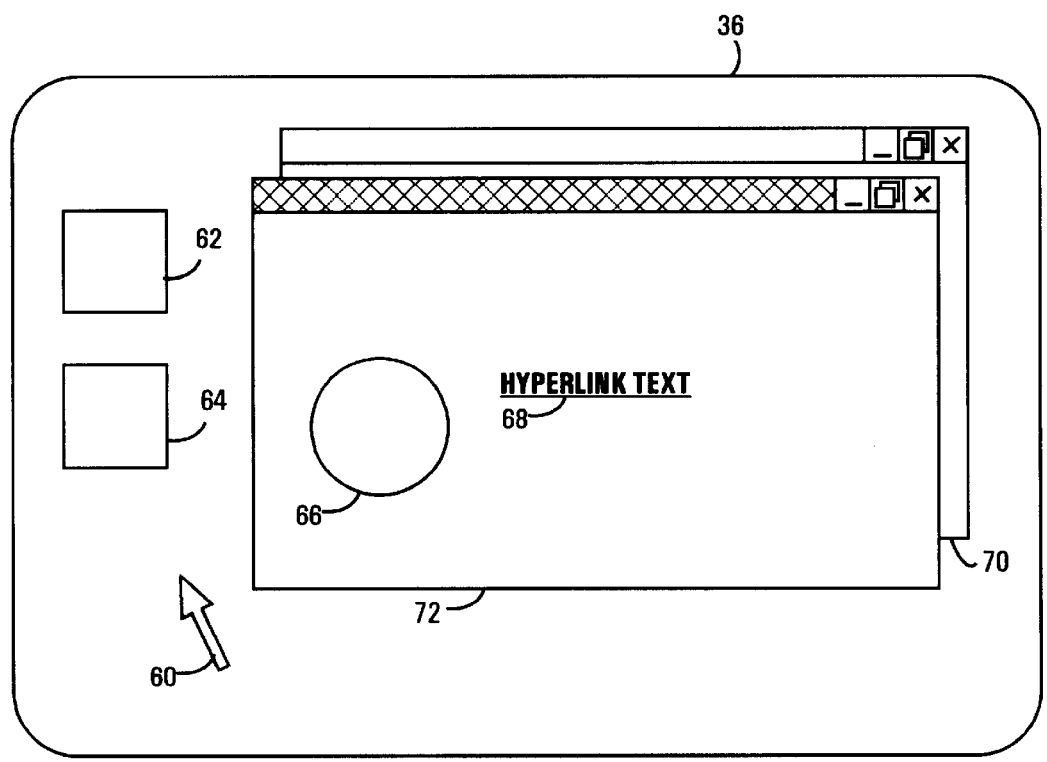
FIG. 4 is a depiction of a graphical user interface (GUI) on a computer display of FIGS. 2 and 3, including a pointing device controlled pointer and a plurality of GUI objects such as icons and windows.

Referring to FIG. 4, a depiction of a graphical user interface (GUI) on the computer display 36 of FIG. 2 includes a pointer 60 and a plurality of graphical display elements such as icons 62, 64, 66 hyperlink text 68 and windows 70, 72. Using pointing device 42, a user may position pointer 60 over one of the graphical display elements or objects and then, for example, interact with an element by clicking button 44 of the pointing device 42.

Although a visually sensed graphical user interface (GUI) is depicted in FIG. 4, it should be appreciated by those skilled in the art that the display is graphical in that interaction is performed spatially. Users may be provided tactile, audio and/or visual cues as to the location of the pointer 60 and any underlying graphical display element rather than merely visual.

Figure 5:
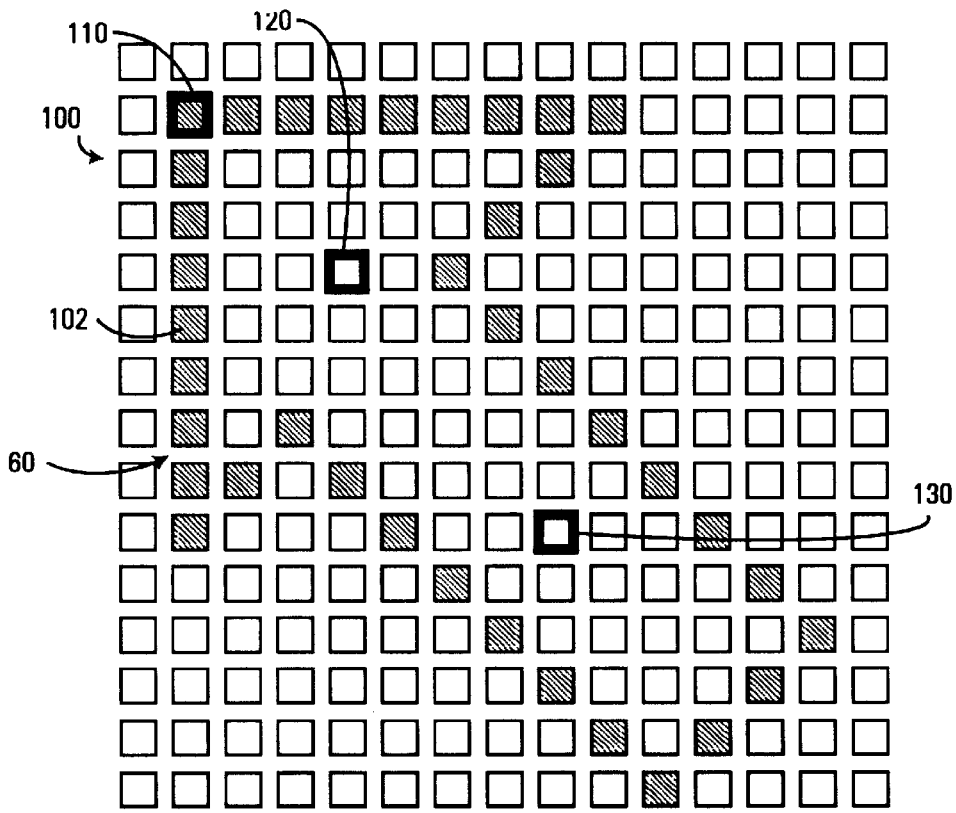
FIG. 5 is a depiction of a pointer bit map display of the pointer of FIG. 4, the pointer including a default and two alternate hot spots.

FIG. 5 is a depiction of a pointer bit map display 100 of the pointer 60 of FIG. 4, depicted in this instance as a shape 102. Typically, pixels surrounding the shape 102 would be transparent and thus allow other objects at these pixels on the computer display 36 to be evident. The pointer 60 includes a first default hot spot 110 and two alternate hot spots 120, 130, that may be displayed to the user or not.

Moreover, a dynamic definition for alternate coordinates may be employed rather defining a specific relative coordinate for the second and third hot spots 120, 130. For example, a plurality of hot spots may be defined and prioritized based on user historical use of the pointing device. Rapid pointer 60 movement may expand alternate hot spots 120, 130 relative to the default hot spot 110. Tendencies to select graphical display elements with a lower priority alternate hot spots such as third coordinate 130 may result in reprioritizing defined coordinates.

It should also be appreciated that principles of the invention are applicable to other similar graphical user interfaces, such as displays and pointing devices capable of representing and interacting within a three-dimensional space. As another example, some computer displays may use a stroke representation of graphical display elements rather than a rastorized pixel display. In addition, the density of the computer display pixels may not correspond one to one with the coordinates of the pointer and graphical display elements.

Figure 6:
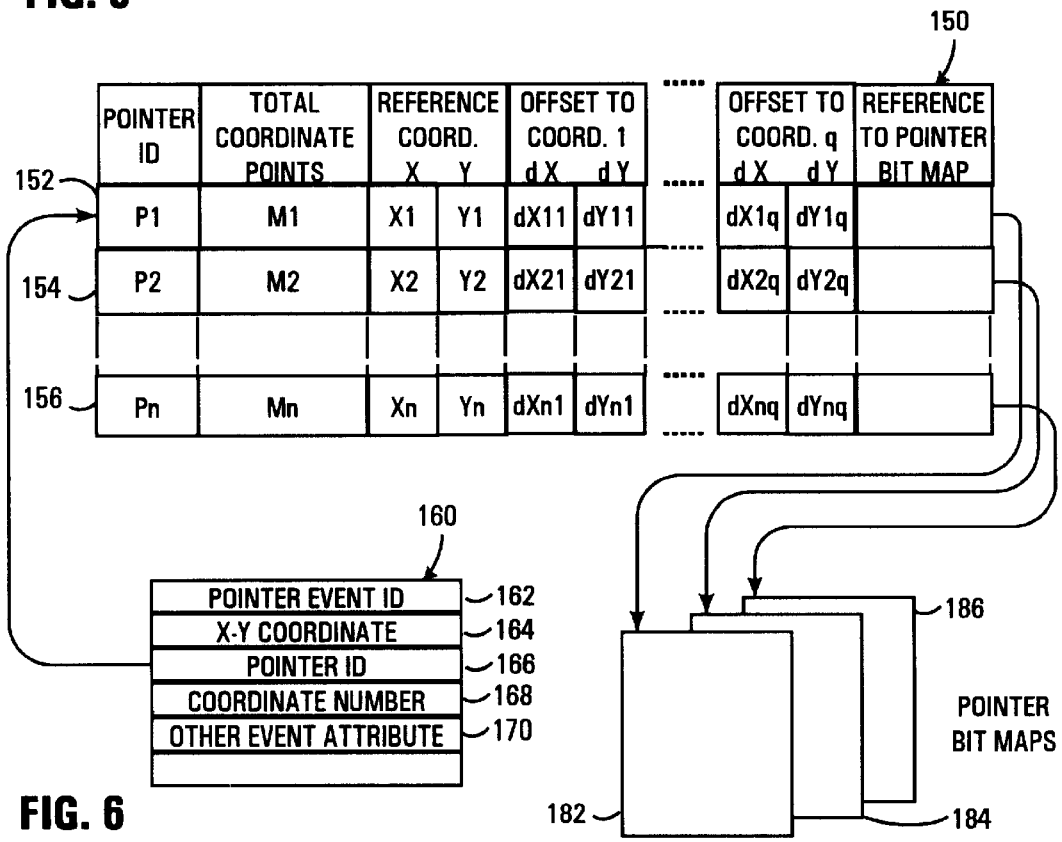
FIG. 6 is a depiction of a data structure for a pointer ID table related to a pointer event record and pointer bit maps.

FIG. 6 is a depiction of a data structure for a pointer ID table 150 including a plurality of pointer ID records 152, 154, 156, each defining a second chance pointer having at least one alternate hot spot or coordinate. Such definition may advantageously include a pointer ID, total number of coordinate points for the pointer, a reference coordinate relative to the display of the pointer from which hot spots are defined (which may be the first coordinate), offset to each coordinate, and a reference to a pointer bit map 182, 184, 186 for each respective pointer record 152, 154, 156.

It will be appreciated that any number of such pointer records and pointer bit maps may be defined. Moreover, there need not be a one-to-one relationship between pointer records and pointer bit maps. For example, a user may choose a pointer depiction such as a hand or arrow. Independent of this selection, a second coordinate may be defined as an offset from the default first coordinate or hot spot.

It will also be appreciated by those skilled in the art that selection of an appropriate pointer 60 may be automatically performed based on factors such as the type of application, historical preference of the user, or detected type of computer display and pointing device 42. Furthermore, the user may manually select a preferred pointer 60, including its depiction (e.g., pointer bitmap 10) and location and priority of hot spots 110, 120, 130.

When the window manager 54 receives a pointer event, such as a button click from a pointing device 42, a data structure may be created characterizing the pointer event such as pointer event record 160. In order to process the pointer event, pointer event record 160 may advantageously include a pointer event identification 162, X-Y coordinate 164 of a reference point for the pointer 60, pointer ID 166 which cross references a pointer ID record 152 defining the hot spots for the pointer, coordinate number 168 defining the active hot spot or coordinate, and any other event attribute (identified at 170).

Figure 7:
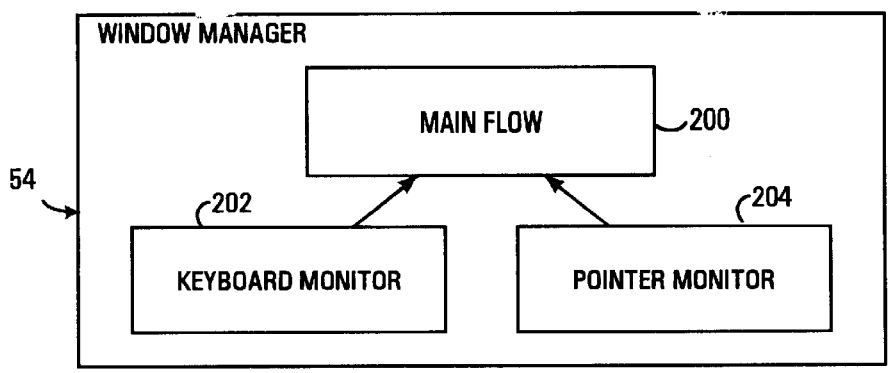
FIG. 7 is a block diagram illustrating the primary components of the window manager of FIG. 3.

FIG. 7 is a block diagram of a window manager 54 illustrating a main flow routine 200 receiving inputs from a keyboard monitor 202 and a pointer monitor 204. The pointer monitor 204 may be a software object of the window manager 54 that monitors inputs from the pointing device 42 and creates pointer event records for processing by the main flow routine 200. The pointer monitor may reside in a distinct interface to the pointing device 42 wherein the pointer event record 160 is relayed to the window manager 54 residing in separate memory, for example. Moreover, the pointer monitor 204 may be part of an application 57, 58 and different from a default pointer monitor operating in the window manager 54. For instance, a child's computer game may define a large pointer 60 and utilize alternate hot spots to assist inexperienced users in selecting GUI objects. Thus, if the pointer 60 is positioned outside of the window 57 for the child's computer game or the game is closed, the pointer 60 reverts to a default pointer 60.

Figure 8:
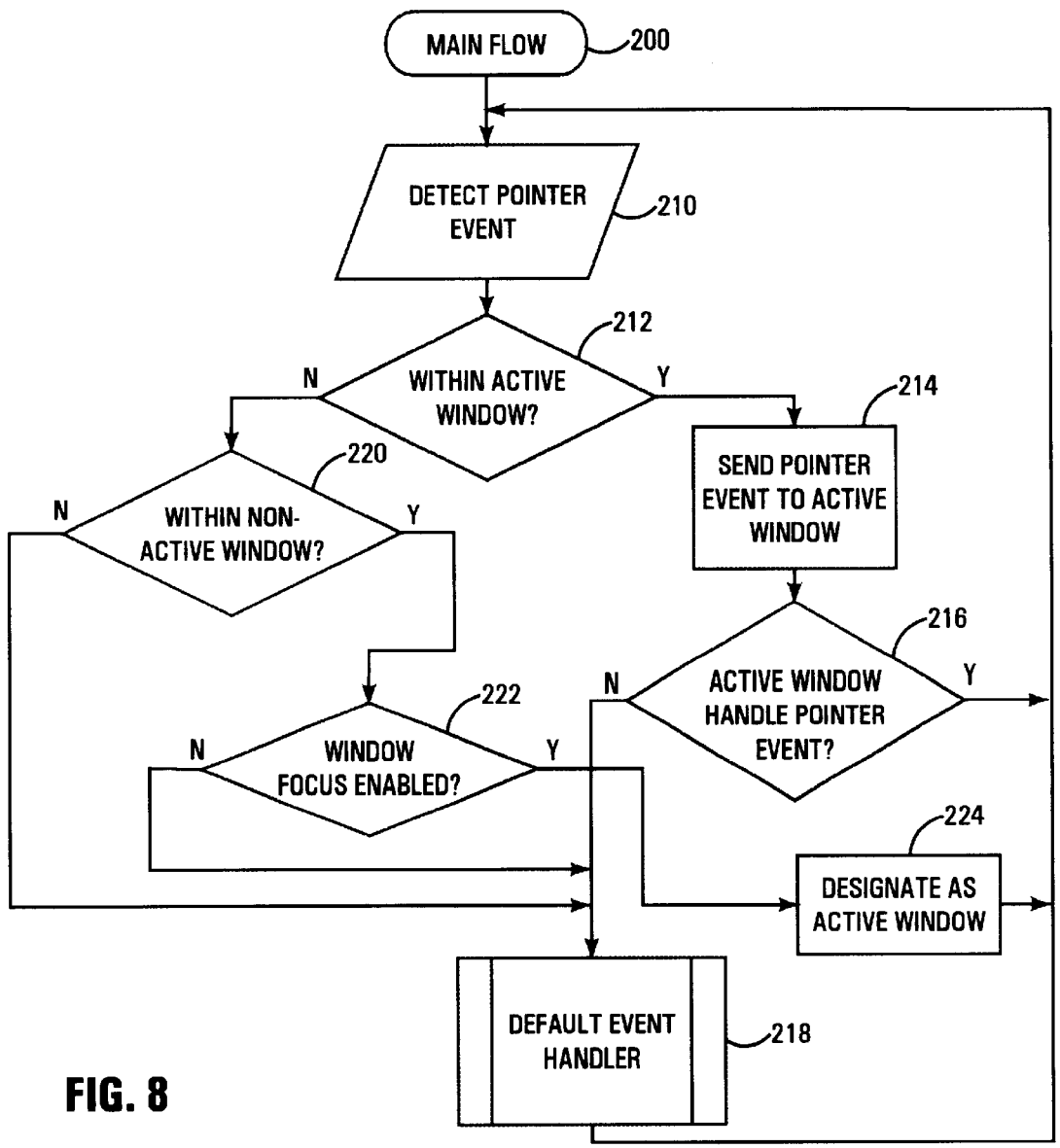
FIG. 8 is a flowchart illustrating a main flow routine for the window manager of FIG. 7.

FIG. 8 is a flowchart illustrating a main flow routine 200 for the window manager 54 of FIG. 7 depicting handling of pointer events. It will be appreciated that the main flow routine 200 generally performs a range of functions of which handling a pointer event is one example. These other handling functions are not illustrated. Moreover, processing associated with multiple windows is illustrative, whereas some applications may have only one active application at a time.

Upon detecting a pointer event (block 210), a determination is made as to whether the pointer event is within an active window (block 212). If so, the pointer event is sent to the active window for handling (block 214), which may or may not include a second chance pointer operation. Advantageously, routine 200 then monitors whether the active window handled the pointer event (block 216), and if so, routine returns to block 210 to continue monitoring for pointer events. If the active window did not handle the pointer event in block 216, a default event handler (block 218) is called, after which routine 200 returns to block 210 to continue monitoring for pointer events.

If at block 212 the pointer event was determined to not be within an active window, then a determination is made as to whether the pointer event is within a non-active window (block 220). Such a determination would be appropriate in a multi-window environment when only one window is selected (or activated) at a time. If the pointer event was not within a non-active window in block 220 then the pointer event is not within any window and the default event handler 218 is called and routine 200 returns to 210.

However, if the condition in block 220 is satisfied by the pointer event being within a non-active window 70, then a determination is made in block 222 as to whether window focus is enabled. If so, the non-active window is designated as an active window (block 224) and processing returns to block 210. Designating a non-active window as active may also include updating the display to indicate the change to the user, for instance. Alternatively, the pointer event may additionally be passed to the now active window for processing rather than requiring a subsequent pointer event. If in block 222 window focus is disabled or is not inherent in the window manager 54, then the pointer event is sent to the default event handler 218 and processing returns to block 210 for continued pointer monitoring.

It should be appreciated that the main flow routine 200 illustrates in general that second chance pointer operation occurs when the active hot spot of a pointer does not overlay a GUI object or element, and thus, default pointer event handling is appropriate.

Figure 9:
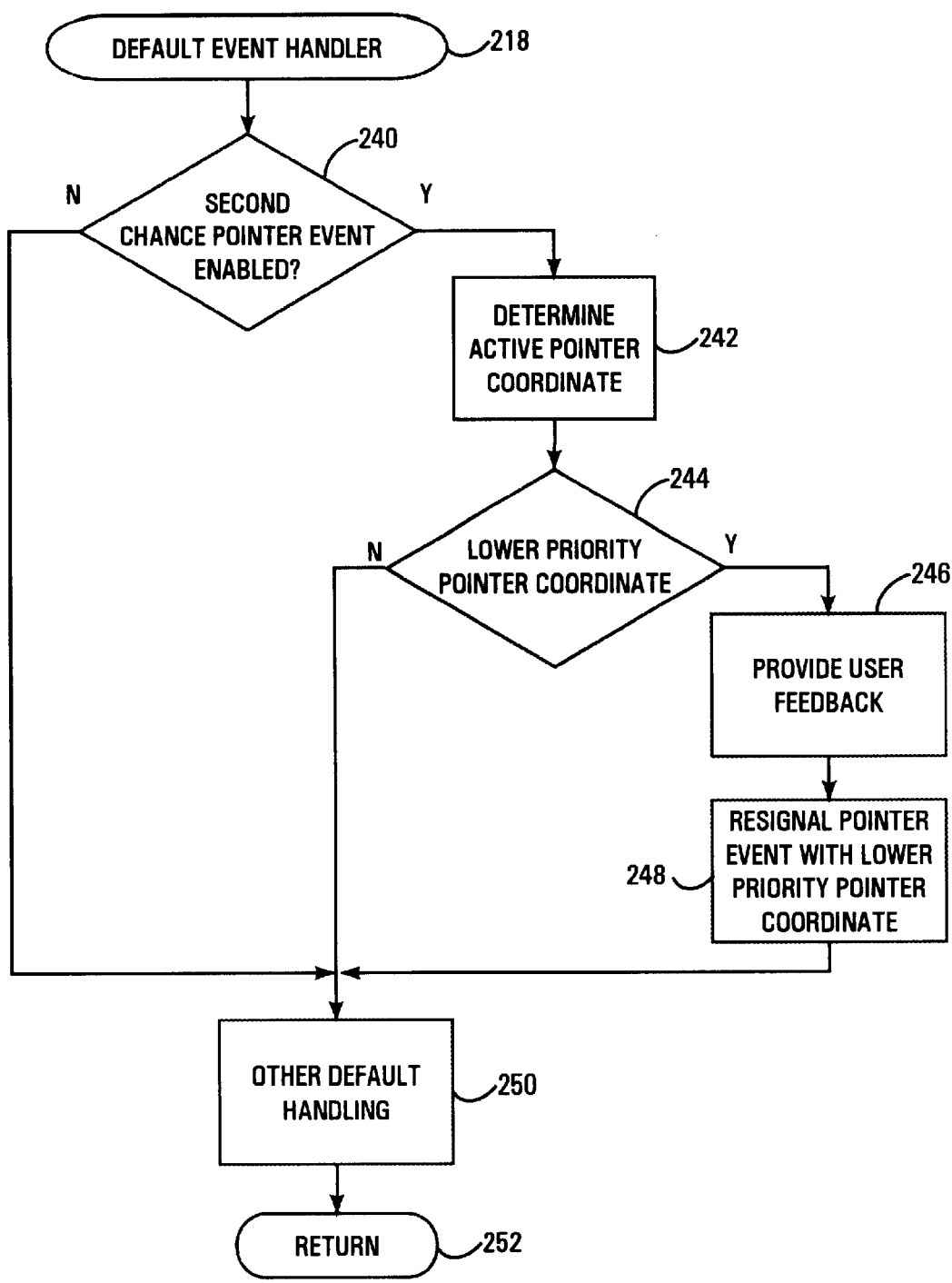
FIG. 9 is a flowchart illustrating a default event handler for the main flow routine of FIG. 8.

FIG. 9 is a flowchart illustrating a default event handler 218 for the main flow routine 200 of FIG. 8. The default event handler 218 may reside within the window manager 54 or an application 56, 58. First, a determination is made as to whether second chance pointer operation is enabled (block 240). Such a capability may be implicit when a pointer ID control table 150 defines multiple coordinates for a pointer 60. Also, a specific control panel function may allow a user to enable and/or disable second chance pointer operation. Furthermore, specific applications may inhibit an otherwise enabled second chance pointer operation. Also note that block 240 could be omitted, and thus second chance pointer operation would always be performed.

If second chance pointer operation is enabled in block 240, then the active pointer coordinate is determined (block 242), such as by referencing the pointer event record 160 and pointer ID control table 150 of FIG. 6. If a lower priority pointer coordinate (alternate hot spot) exists (block 244), then a second chance pointer operation is available. Advantageously, such second chance pointer operation may include or be limited to providing user feedback (block 246), examples of which will be described below for FIGS. 10A–D. Then, the pointer event is resignaled with a lower priority pointer coordinate (block 248). For example, the default event handler 218 may determine that a GUI object is overlaid by the lower priority coordinate and select the GUI object. Alternatively, the pointer event record may be altered by incrementing the coordinate number 168 in the pointer event record 160 and allowing the main flow routine 200 to reinterpret the pointer event as if it is a new pointer event. Thus, the default event handler 218 may not determine whether the next coordinate overlays a GUI object but just resignals with the next alternate coordinate. Consequently, the second chance pointer operation may iterate in this type of implementation through each coordinate of the pointer until either a GUI object is selected or coordinates are exhausted.

It will be appreciated that block 246 may be omitted. Moreover, the second chance pointer operation in block 248 may provide sufficient feedback to a user in some instances.

Default event handler 218 may include other default handling performed before, in parallel with, or after second chance pointer operation, as illustrated at block 250, shown as being performed after block 248 or after blocks 240 and 244 when their respective conditions are not satisfied, and thus second chance pointer operation was not warranted. Thereafter, routine 218 returns (block 252) to the main flow routine 200.

FIGS. 10A–D are simplified depictions of a pointer 60 and GUI object 62 on a computer display 36, illustrating several possible orientations of hot spots (coordinates) and user feedback of second chance pointer operation.

Figure 10A:
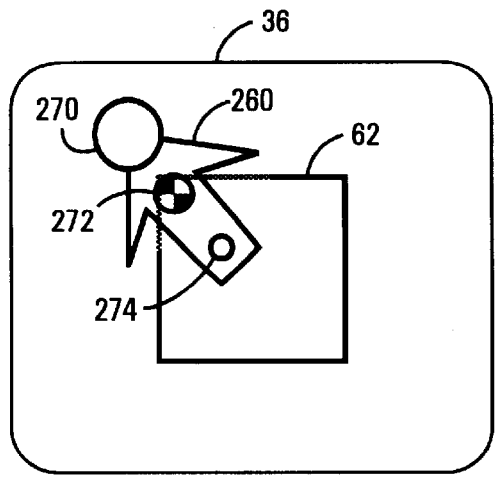
FIGS. 10A–D are simplified depictions of a pointer and GUI object on a computer display, illustrating orientations of hot spots (coordinates) and user feedback of second chance pointer operation.

Referring to FIG. 10A, a pointer 260 is depicted as partially overlaying a GUI object 62 upon a computer display 36. The pointer 260 advantageously includes feedback for the user as to the location, priority and status of coordinates on the pointer 260. The default hot spot 270 would be the first coordinate and is shown as the highest priority by its larger radius as compared to a second coordinate 272 and a third coordinate 274. Since the first coordinate 270 does not overlay the GUI object 62, the second coordinate is highlighted with a pattern that may be part of, or comprise, the second chance pointer operation. For example, the changed pointer display may precede resignaling the pointer event with the second coordinate 272, so that the user will receive feedback as to how he has activated the GUI object 62. Alternatively, the changed display of the second coordinate may prompt the user to reposition the pointer 60 such that the first coordinate is over the GUI object 62 if desired. As yet a further alternative, the changed display of the second coordinate 272 may provide an opportunity to readily resignal the pointer event at the second coordinate 272 if the user takes an action such as clicking the button 44 again without having to reposition the pointer 260 or by clicking a different button 46.

Figure 10B:
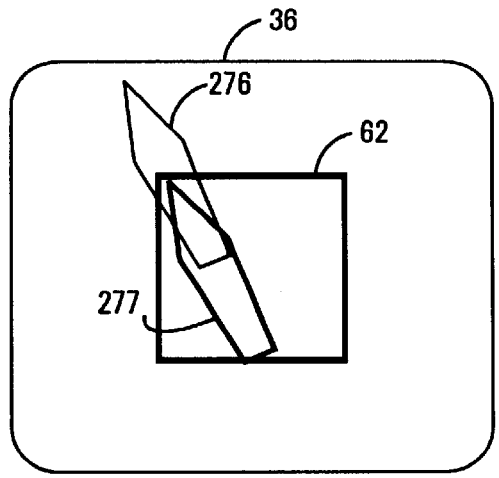

Referring to FIG. 10B, the pointer 276 shifts to a position 277 with respect to the computer display 36 and the GUI object 62 as feedback to the user as to the reprioritized hot spot.

Figure 10C:
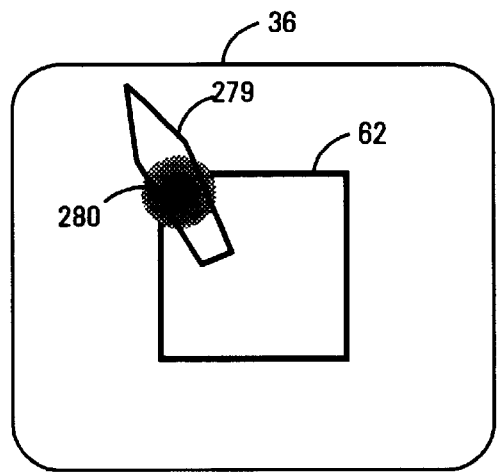

Referring to FIG. 10C, the feedback to a user is in the form of a pointer 279 having an alternate hot spot 280 having an expanded highlight for better visibility. Moreover, the feedback may advantageously precede the pointer event. Thus, the pointer monitor 10 may evaluate the highest priority hot spot or coordinate for which a GUI object 62 is overlaid, such that the user is informed that associated processing will occur if the pointing device 42 generates a pointer event, thus avoiding inadvertent selection of a GUI object 62 and avoiding intrusive confirmation prior to resignaling a pointer event. Consequently, the user selection operation is the positioning of the pointer with at least one coordinate (hot spot) overlaying the graphical display element and the second chance pointer operation may providing feedback as to the coordinate that will be the location for pointer event if performed.

Figure 10D:
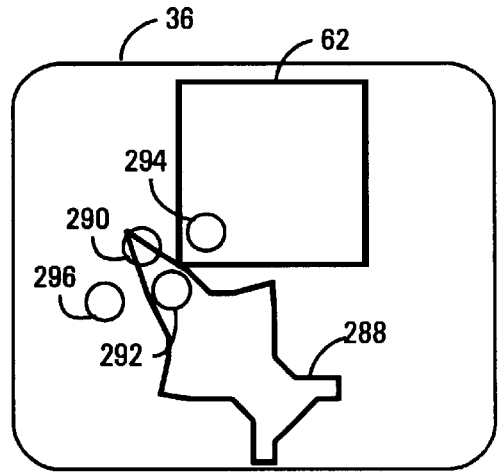

Referring to FIG. 10D, a pointer 288 is depicted as not visually overlaying a GUI object 62 on a computer display 36. Four coordinates for a default hot spot 290 and prioritized alternate coordinates 292, 294 and 296 are defined for the pointer. The four coordinates 290–296 may not be displayed, displayed intermittently, or displayed continuously, depending on the application. Coordinate 294 illustrates use of an alternate coordinate or hot spot 294, 296 that is outside of the visual depiction of the pointer 288. An advantage of such coordinates 294, 296 is that a user may select a pointer 288 without degrading a second chance pointer operation.

It will be appreciated that the depictions in FIGS. 10A–D are not limiting. For example, the type of GUI object 62 could alter the second chance pointer operation. For instance, a desktop icon may prompt a shift of the pointer 60 such as shown in FIG. 10B whereas a hypertext link as the GUI object 62 may prompt activating the hypertext link. As another example, in addition to, or as an alternative of, a visual feedback of an alternate coordinate, an audio and/or tactile feedback could be provided to a user.

Various additional modifications may be made to the embodiments described herein without departing from the spirit and scope of the invention. Therefore, the invention lies in the claims hereinafter appended.

What is claimed is:

1. A method of selecting a graphical display element displayed on a computer display using a user-manipulated pointing device, comprising:
   in response to a user selection operation initiated by a user, determining whether a first coordinate associated with the user-manipulated pointing device is disposed within an input region of the graphical display element;
   in response to determining that the first coordinate is not within the input region, selecting the graphical display element if a second coordinate associated with the user-manipulated pointing device is disposed within the input region; and
   displaying feedback to the user if the second coordinate associated with the user-manipulated pointing device is disposed within the input region, wherein displaying feedback includes repositioning a pointer associated with the user-manipulated pointing device to correspond with the second coordinate.

2. The method of claim 1, wherein selecting the graphical display element further comprises referencing a pointer identification control table, associated with the user-manipulated pointing device, for the second coordinate.

3. A method of selecting a graphical display element displayed on a computer display using a user-manipulated pointing device, comprising:
   in response to a user selection operation initiated by a user, determining whether a first coordinate associated with the user-manipulated pointing device is disposed within an input region of the graphical display element;
   in response to determining that the first coordinate is not within the input region, selecting the graphical display element if a second coordinate associated with the user-manipulated pointing device is disposed within the input region; and
   displaying feedback to the user if the second coordinate associated with the user-manipulated pointing device is disposed within the input region, wherein displaying feedback includes altering the display of a pointer associated with the user-manipulated pointing device to indicate the second coordinate.

4. The method of claim 1, wherein determining whether the first coordinate is disposed within the input region is performed responsive to a first pointer event, and wherein selecting the graphical display element includes resignaling a second pointer event at the second coordinate.

5. A method of controlling a computer system with a pointing device coupled to a pointer on a computer display, the pointing device adapted to input a pointer event at a first coordinate position relative to the pointer, the method comprising:
   in response to a first pointer event, determining whether the first coordinate position relative to the pointer overlays an input region of a graphical display element, wherein determining whether the first coordinate position relative to the pointer overlays a graphical display element further includes:
      determining whether the first coordinate position is within one of an active window and an inactive window;
      in response to the first coordinate position being within the active window, sending the pointer event to the active window; and
      in response to the first coordinate position being within the inactive window, performing an inactive window pointer event action; and
   if not, generating a second pointer event at a second coordinate position relative to the pointer.

6. The method of claim 5, wherein generating the second pointer event is performed by a default event handler.

7. The method of claim 5, wherein performing the inactive window pointer event action includes focusing by setting the inactive window as an active window.

8. The method of claim 5, wherein generating the second pointer event at the second coordinate position relative to the pointer includes accessing a pointer information control table to locate relative positioning for the second coordinate position.

9. The method of claim 5, wherein determining whether the first coordinate position relative to the pointer overlays the input region of the graphical display element comprises:
   referencing a pointer event record including a selected coordinate pointer and the second coordinate position; and determining that the selected coordinate pointer corresponds to the first coordinate position.

10. The method of claim 9, wherein generating the second pointer event at the second coordinate position relative to the pointer comprises:

changing the selected coordinate pointer to correspond to the second coordinate position; and resignaling the pointer event record including the changed selected coordinate pointer.

11. An apparatus configured to select a graphical display element with a pointer displayed on a computer display using a user-manipulated pointing device, comprising:

(a) a memory; and (b) a program, resident in the memory, the program configured, in response to a user selection operation initiated by a user, to determine whether a first coordinate associated with the pointer is disposed within an input region of the graphical display element, and, in response to determining that the first coordinate is not within the input region, to perform a second chance pointer operation, wherein the program is further configured to identify a plurality of prioritized coordinates associated with the user-manipulated pointing device, and to perform the second chance pointer operation at a second coordinate comprising the highest priority one of the prioritized coordinates disposed within the input region the second chance pointer operation including at least one of repositioning the pointer to correspond to the second coordinate and altering the display of the pointer to indicate the second coordinate.

12. The apparatus of claim 11, wherein the user selection operation comprises positioning the pointer using the user-manipulated pointing device, and wherein the program is configured to perform the second chance pointer operation by providing feedback at the second coordinate of the pointer in response to the second coordinate being disposed within the input region.

13. The apparatus of claim 11, wherein the program is configured, in response to the second coordinate being disposed within the input region, to perform the second chance pointer operation by selecting the graphical display element.

14. The apparatus of claim 11, wherein the user selection operation includes a first pointer event at the first coordinate, and wherein the program is further configured to perform the second chance pointer operation by resignaling a second pointer event at the second coordinate.

15. The apparatus of claim 14, further including a pointer event record, resident in memory, defining the first pointer event including a location on the computer display, and wherein the program is configured to resignal the second pointer event by changing the location in the pointer event record from the first coordinate to the second coordinate of the pointer.

16. The apparatus of claim 11, wherein the user selection operation includes a pointer event, and wherein the program is further configured to perform the second chance pointer operation by providing feedback to the user in response to the pointer event.

17. An apparatus configured to select a graphical display element with a pointer displayed on a computer display using a user-manipulated pointing device comprising:

(a) a memory; and (b) a program, resident in the memory the program configured, in response to a user selection operation initiated by a user, to determine whether a first coordinate associated with the pointer is disposed within an input region of the graphical display element, and, in response to determining that the first coordinate is not within the input region, to perform a second chance pointer operation, wherein the program is further configured to provide feedback to the user by repositioning the pointer to correspond to a second coordinate associated with the pointer.

18. An apparatus configured to select a graphical display element with a pointer displayed on a computer display using a user-manipulated pointing device, comprising:

a memory; and (b) a program, resident in the memory, the program configured, in response to a user selection operation initiated by a user, to determine whether a first coordinate associated with the pointer is disposed within an input region of the graphical display element, and, in response to determining that the first coordinate is not within the input region, to perform a second chance pointer operation, wherein the program is further configured to display feedback by altering the display of the pointer to indicate a second coordinate associated with the pointer.

19. The apparatus of claim 11, further including a pointer identification control table, resident in memory, the table configured to associate the first and second coordinates with the user-manipulated pointing device, and wherein the program is further configured to read the first and second coordinates of the table.

20. The apparatus of claim 11, further including a default event handler, resident in memory, configured to perform the second chance pointer operation at the second coordinate.

21. An apparatus configured to select a graphical display element with a pointer displayed on a computer display using a user-manipulated pointing device, comprising:

(a) a memory;

(b) a program, resident in the memory the program configured, in response to a user selection operation initiated by a user, to determine whether a first coordinate associated with the pointer is disposed within an input region of the graphical display element, and, in response to determining that the first coordinate is not within the input region, to perform a second chance pointer operation;

(c) a default event handler, resident in memory, configured to perform the second chance pointer operation at a second coordinate; and (d) a window manager, the window manager including the default event handler, wherein the input region of the graphical display element is disposed within one of a window desktop, active window, and non-active window.

* * * * *